United States Patent
Chen et al.

(10) Patent No.: US 7,745,044 B2
(45) Date of Patent: Jun. 29, 2010

(54) BATTERY MODULE

(75) Inventors: Hsien-Hung Chen, Taipei Hsien (TW); Nan-Sheng Chang, Taipei Hsien (TW); Chuan-Jung Wang, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 556 days.

(21) Appl. No.: 11/669,543

(22) Filed: Jan. 31, 2007

(65) Prior Publication Data
US 2008/0182165 A1    Jul. 31, 2008

(51) Int. Cl.
*H01M 6/42* (2006.01)
(52) U.S. Cl. .................... 429/149; 429/76; 429/120; 429/177
(58) Field of Classification Search .................. 429/149
See application file for complete search history.

(56) References Cited

U.S. PATENT DOCUMENTS 6,228,526 B1 *  5/2001  Ozer et al. ............... 429/96
2003/0027042 A1 *  2/2003  Huang ....................... 429/176

* cited by examiner

*Primary Examiner*—Dah-Wei D Yuan
*Assistant Examiner*—Patricia Davis
(74) *Attorney, Agent, or Firm*—WPAT, P.C.; Anthony King

(57) ABSTRACT

A battery module includes a battery case, at least a battery, and at least a thermal pad. The battery case includes a top cover and a bottom cover. The battery is received in the bottom cover of the battery case. The thermal pad is placed in a chamber of the batteries and pressed by the top cover of the battery case after the top cover and the bottom cover covering together. Therefore, the thermal energy created by the battery module can be easily transmitted to the outside of the battery module case along the thermal pad.

1 Claim, 6 Drawing Sheets

BATTERY MODULE

BACKGROUND OF THE INVENTION

1. Field of the Invention

The present invention relates to a battery module, and more particularly to a battery module beneficial for thermal conducting.

2. The Related Art

Battery modules are widely used in kinds of the electrical products. It is an important device as a power supply suitable for such electrical products. When the battery module is overloaded, the battery module is usually overheated and easily damaged, even leading to exploding seriously.

The common battery module is composed of a battery case and a plurality of the batteries. A thermal energy created by the batteries has to emit out of the battery module by a substance of atmosphere filled in the battery case and batteries. Sometimes, the battery case often defines a plurality of holes to enhance thermal conducting rate, but it is not a desirable way to raise the thermal conducting rate effectively by the atmosphere.

SUMMARY OF THE INVENTION

A first object of the present invention is to provide a battery module which has a thermal pad to avoid a damage in a condition of the battery module being overheated when the battery module working.

In order to fulfill the first object, the present invention of the battery module includes a battery case, at least a battery, and at least a thermal pad. The battery case includes a top cover and a bottom cover. The battery is received in the bottom cover of the battery case. The thermal pad is placed in a chamber of the batteries and pressed by the top cover of the battery case after the top cover and the bottom cover covering together.

A second object of the present invention is to provide a thermal conducting method for transmitting thermal energy in a battery module.

In order to fulfill the second object, a step of a thermal conducting method for transmitting thermal energy in a battery module includes:

a. turning a fluid thermal conducting material from a liquid state into a solid state to form a thermal pad according to a prepared mode shaped as a battery module; and b. placing the thermal pad into a chamber which is defined between batteries and a battery case of the battery module, confirming a bottom surface of the thermal pad adhering to a battery surface in the battery module and a top surface of the thermal pad adhering to the battery case.

The battery module in the present invention receives the thermal pad to enhance thermal conducting rate. Therefore, the thermal energy created by the battery module can be easily transmitted to the outside of the battery module case along the thermal pad.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
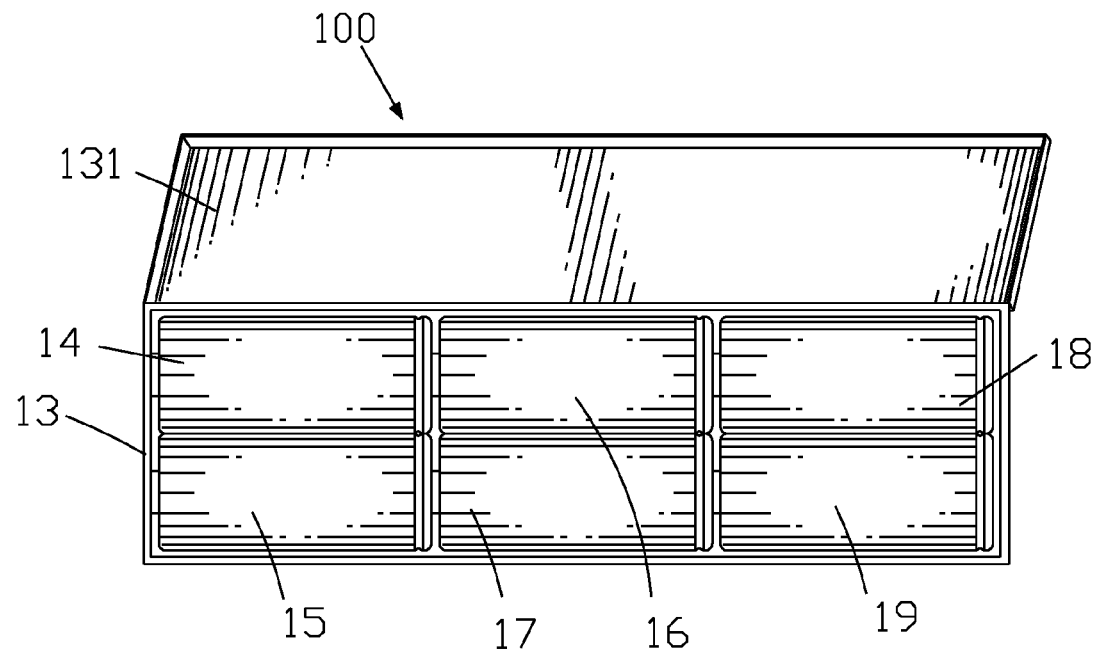
FIG. 1 is a perspective view of a battery module to the present invention.

For facilitating understanding, like components are designated by like reference numerals throughout the various embodiments of the invention as shown in the attached drawings.

Figure 2:
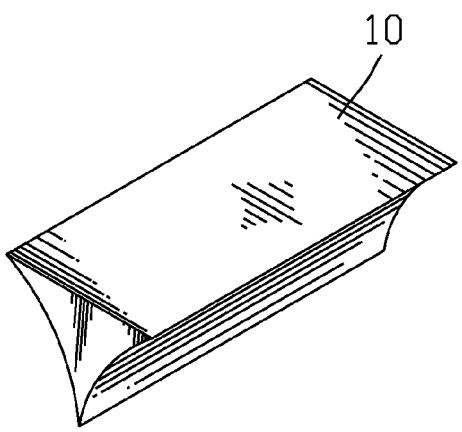
FIG. 2 is a perspective view of a thermal pad.

Referring to FIG. 1 and FIG. 2, a battery module 100 having a thermal pad 10 is disclosed. The battery module 100 includes a battery case 13 which has a top cover 131 and a bottom cover 132. Six cylinder batteries 14, 15, 16, and 17 are divided into three groups which are defined as a first battery group (Cell-1) 14 and 15, a second battery group (Cell-2) 16 and 17, and a third battery group (Cell-3) 18 and 19. Two batteries of each battery groups arranged side by side are received in the bottom cover of the battery case. The electrodes of the first battery group electrically connect to the battery case 13. The electrodes of the second battery group electrically connect to the first battery group. The electrodes of the third battery group electrically connect to the second battery group.

Figure 3:
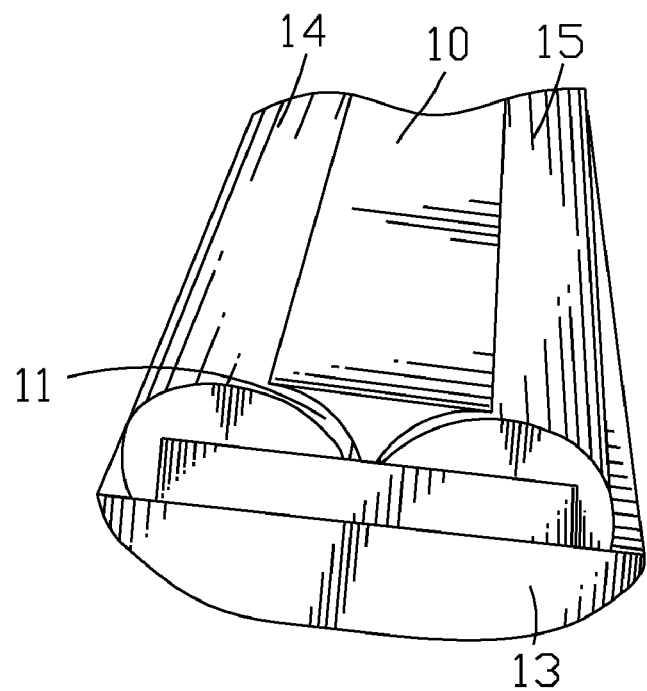
FIG. 3 is a perspective view of a battery module having the thermal pad.
Figure 6:
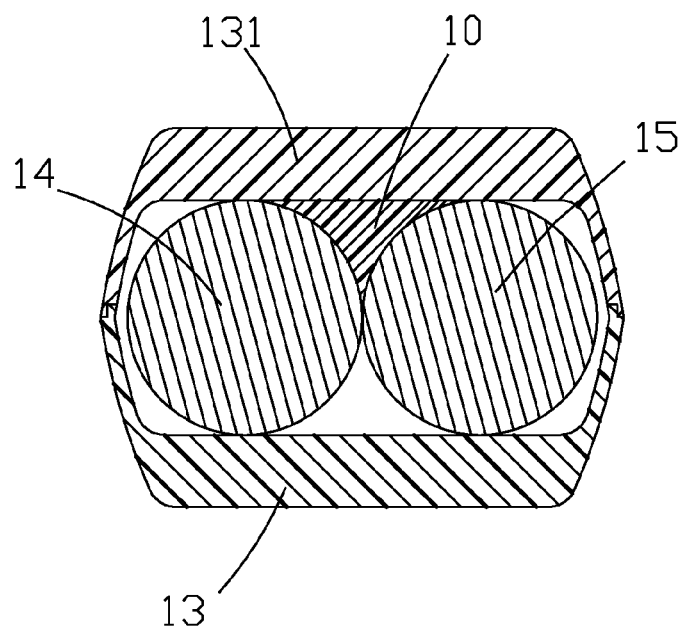
FIG. 6 is a cross-sectional view along a line V-V in FIG. 5.

With reference to FIGS. 3 and 6, the thermal pad 10 is composed of a insulating material and a thermal conducting material and forms a liquid state as a fluid thermal conducting material. A thermal conducting method for transmitting thermal energy in a battery module is like this:

a) turning the fluid thermal conducting material from the liquid state into a solid state to form the thermal pad 10 according to a prepared mode shaped as the battery module 100; and b) placing the thermal pad 10 into a chamber 11 which is defined between the battery 14, 15 and the battery case 131, confirming a bottom surface of the thermal pad 10 adhering to a battery surface in the battery module 100 and a top surface of the thermal pad 10 adhering to the battery case 131.

Figure 4:
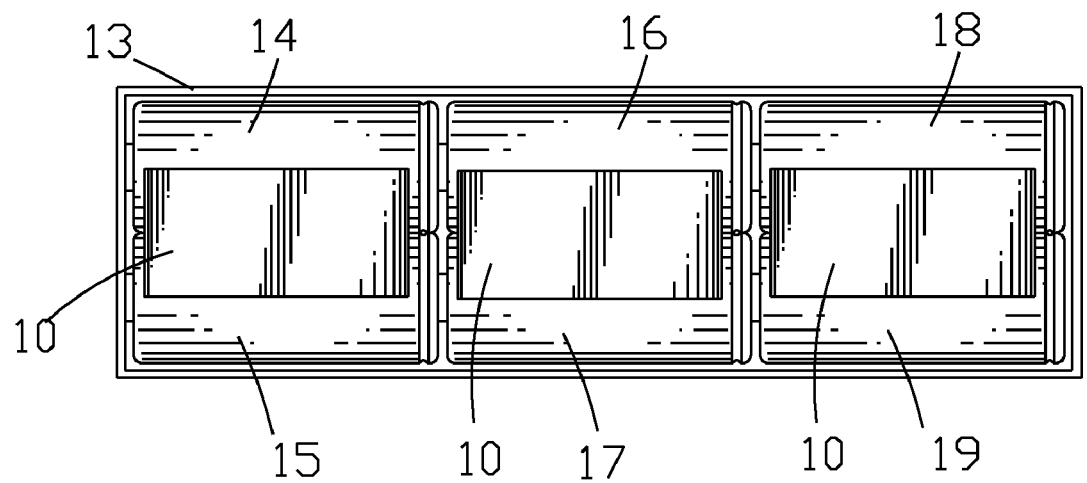
FIG. 4 is a top plan view of the battery module without a top cover.
Figure 5:
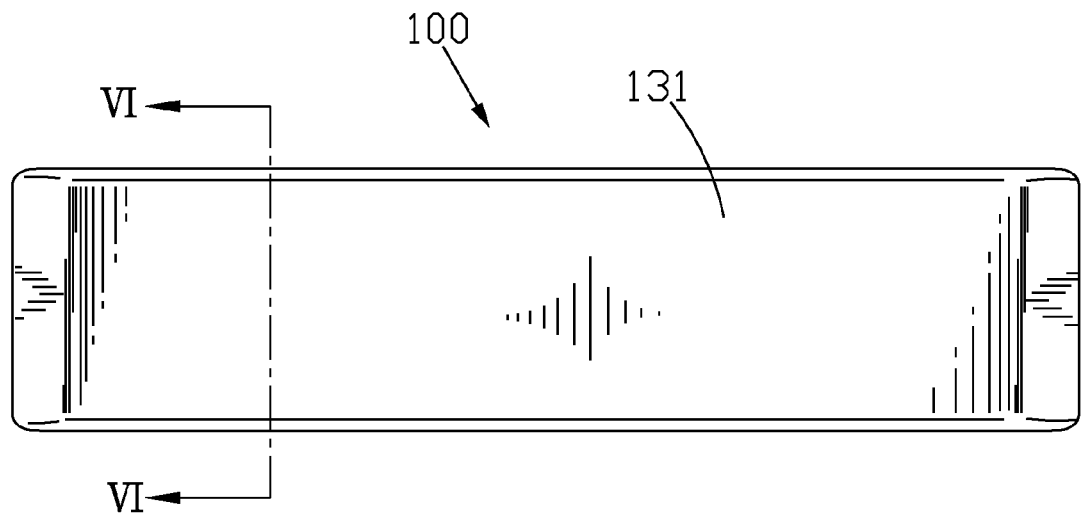
FIG. 5 is a perspective view of the battery module.

With reference to FIGS. 3-5, in the priority embodiment of this invention, the battery 14, 15 each have an arc surface. The chamber 11 is formed on the arc surface of the battery 14, 15, so the chamber 11 has two arc bottom surface and is defined between the cylinder batteries of each groups, such as the battery 14, 15 in the first battery group. The chamber 11 is substantially V-shaped. With reference to FIG. 6, the thermal pad 10 has an inverted triangle section. The thermal pad 10 is placed in the V-shaped chamber 11 being defined by the battery 14 and 15. The top cover 131 firmly presses the thermal pad 10 tightly adhering to the batteries after the top cover 131 and the bottom cover 132 covering together.

Table 1 below lists the temperature values of the Cell-1, Cell-2, and Cell-3. Table 2 below lists the temperature values of Case-1, Case-2, and Case-3.

TABLE 1

| | Cell | | |
|---|---|---|---|
| | Cell-1 (° C.) | Cell-2 (° C.) | Cell-3 (° C.) |
| Normal | 73.6 | 76.19 | 76.19 |
| Improve | 71.94 | 74.21 | 74.21 |

TABLE 2

| | Case | | |
|---|---|---|---|
| | Case-1 (° C.) | Case-2 (° C.) | Case-3 (° C.) |
| Normal | 61.34 | 57.53 | 56.39 |
| Improve | 63.81 | 64.08 | 59.55 |

Wherein:

the case-1 stands for the temperature of the battery case 13 corresponding to the Cell-1;

the case-2 stands for the temperature of the battery case 13 corresponding to the Cell-2; and the case-3 stands for the temperature of the battery case 13 corresponding to the Cell-3.

According to the table 1, the normal state stands for the temperature on the surface of the batteries of each groups of the normal battery module 100 without the thermal pad 10 and the improve state stands for the temperature on the surface of the batteries of each groups when the thermal pad 10 assembled in the battery module 100. According to the table 2, the normal state stands for the temperature of the battery case corresponding to each group of the normal battery module 100 without the thermal pad 10 and the improve state stands for the temperature of the battery case corresponding to each groups of the battery module 100 when the thermal pad 10 assembled in the battery module 100.

Figure 7:
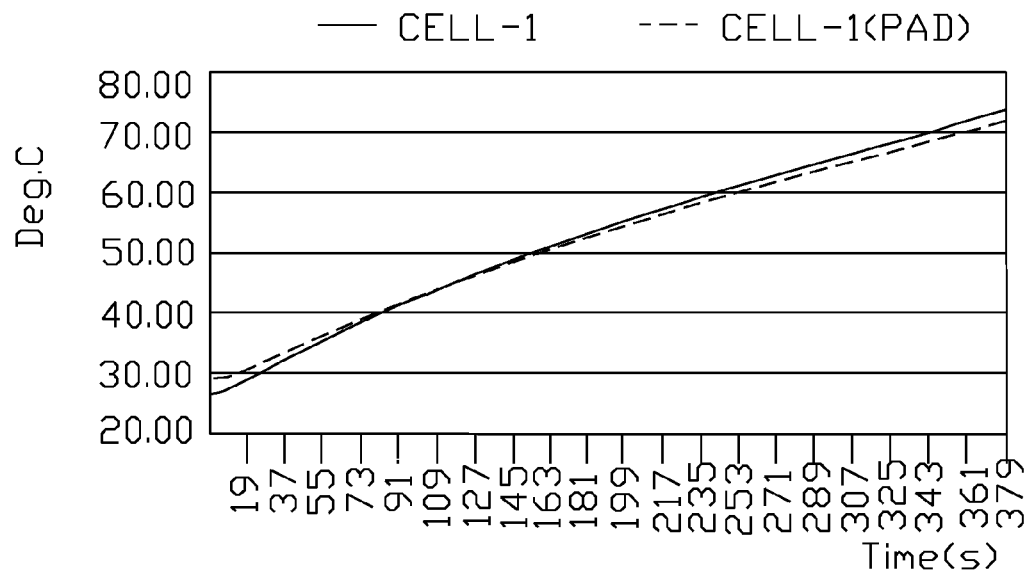
FIG. 7 shows a temperature curve of batteries in a first battery group.
Figure 8:
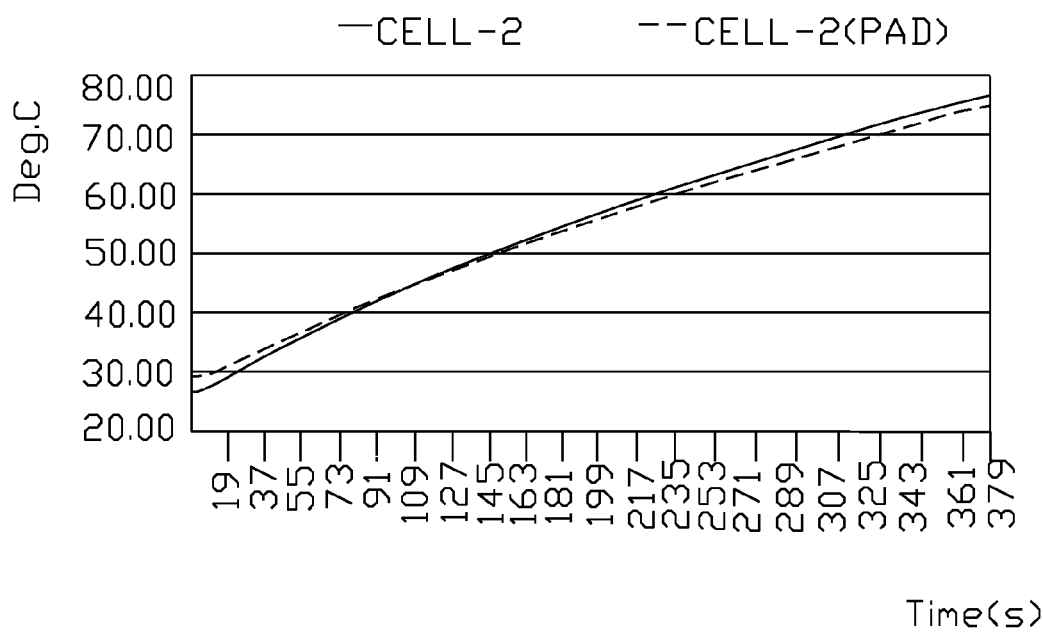
FIG. 8 shows a temperature curve of batteries in a second battery group.
Figure 9:
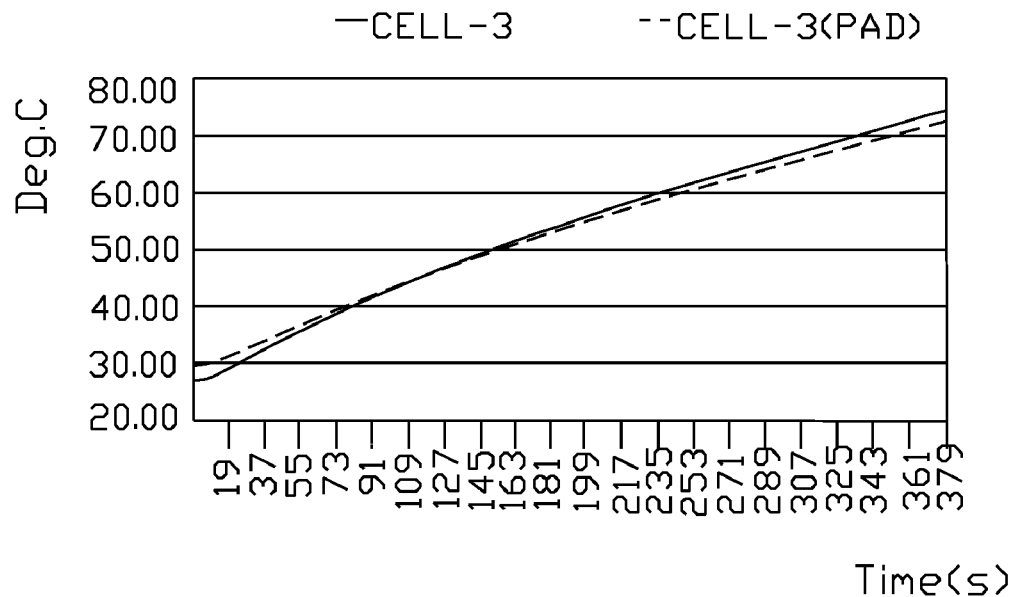
FIG. 9 shows a temperature curve of batteries in a third battery group.
Figure 10:
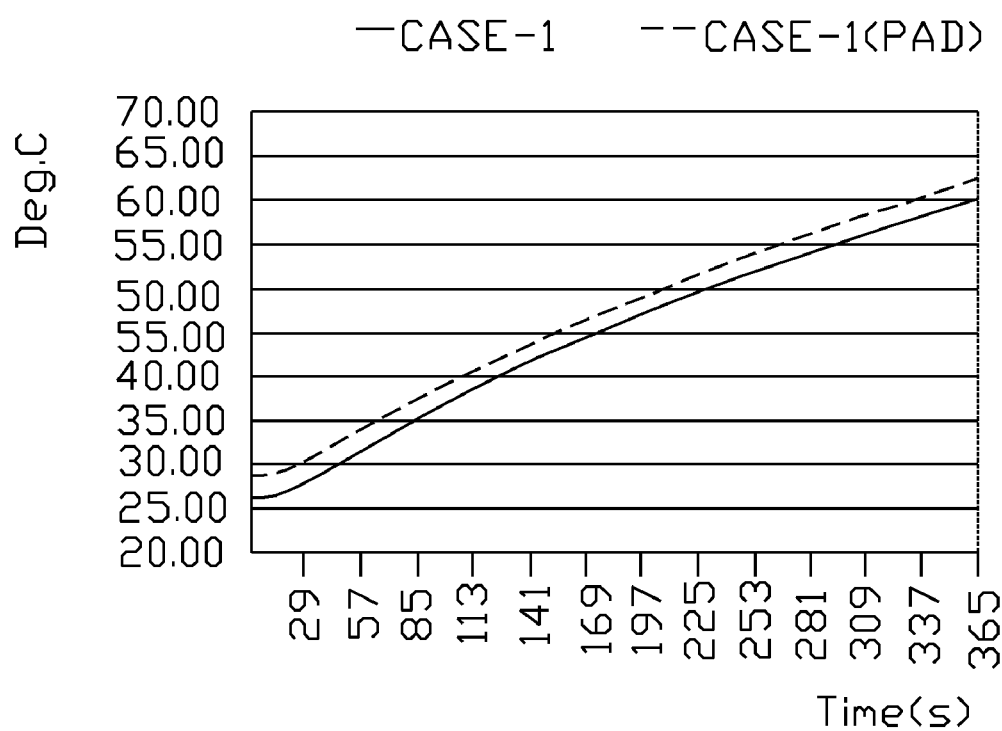
FIG. 10 shows a temperature curve of a battery case corresponding to a first battery group.
Figure 11:
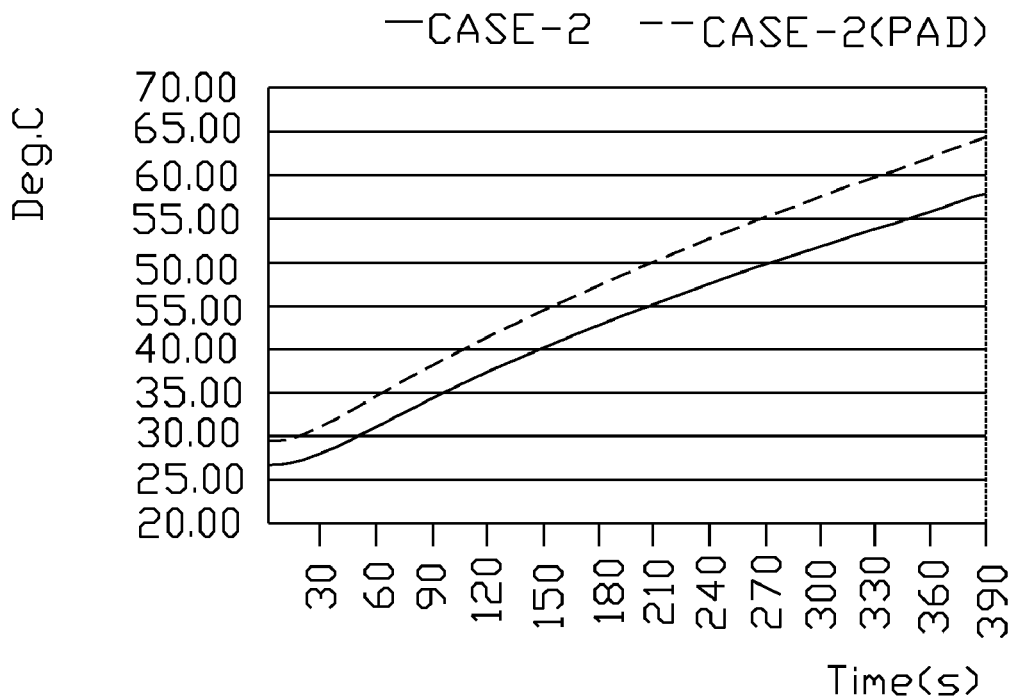
FIG. 11 shows a temperature curve of a battery case corresponding to a second battery group.
Figure 12:
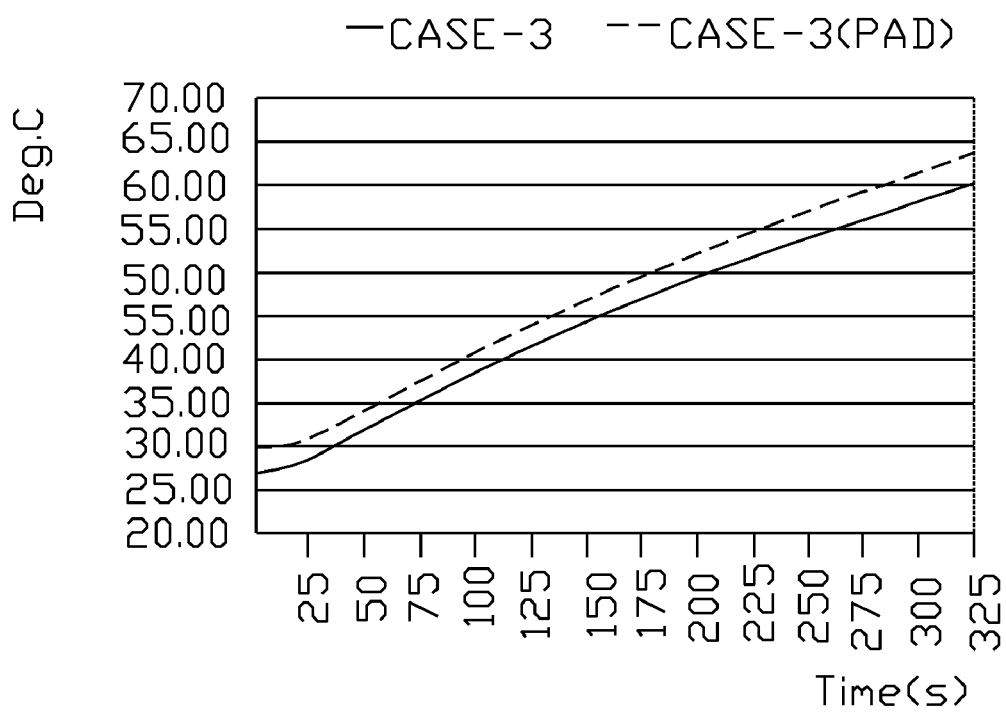
FIG. 12 shows a temperature curve of a battery case corresponding to a third battery group.

With reference to FIGS. 7-9, the cross axle shows the time parameter. The vertical shows the temperature parameter. The solid line shows the temperature curve of each batteries group without the thermal pad 10. The dotted line shows the temperature curve of each batteries group when the thermal pad 10 assembled in the battery module 100. It is clearly shows the temperature of the battery without the thermal pad 10 is higher than the battery adhered to the thermal pad 10. With reference to FIGS. 10-12, the cross axle shows the time parameter. The vertical shows the temperature parameter. The solid line shows the temperature curve of the battery case without the thermal pad 10. The dotted line shows the temperature curve of the battery case corresponding to each group of the battery module 100 when the thermal pad 10 assembled in the battery module 100. It is clearly shows the temperature of the battery case without the thermal pad 10 is lower than the battery adhered to the thermal pad 10. So, it has demonstrated that the battery module 100 with the thermal pad 10 is beneficial to the thermal conduction.

The present invention of the battery module 100 is assembled with the thermal pad 10 which is shaped as the chamber 11, so that a thermal energy created by the battery module 100 can be easily transmitted to the outside of the battery module 100 case by the thermal pad 10.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A battery module comprising:

a battery case including a top cover and a bottom cover;

two batteries received in the bottom cover of the battery case side by side; and a thermal pad engaged in a chamber between the two batteries, the thermal pad being supported on the two batteries and resting against a bottom of the top cover after the top cover and the bottom cover covering together for transmitting the thermal energy created by the two batteries outside the battery case;

wherein the chamber is substantially V-shaped, the thermal pad has a substantially inverted triangle section to conform to the chamber among the two batteries and the top cover.

* * * * *